(12) United States Patent
Usui (10) Patent No.: US 6,895,220 B2
(45) Date of Patent: May 17, 2005

(54) MOBILE COMMUNICATION DEVICE CAPABLE OF CARRYING OUT BOTH INDIRECT AND DIRECT COMMUNICATION

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 725 days.

(21) Appl. No.: 09/833,664

(22) Filed: Apr. 13, 2001

(65) Prior Publication Data

US 2002/0025839 A1 Feb. 28, 2002

(30) Foreign Application Priority Data

Apr. 17, 2000 (JP) ........................................ 2000-114666

(51) Int. Cl.$^7$ ................................................. H04B 7/00
(52) U.S. Cl. ................ 455/41.2; 455/343.1; 455/426.1; 455/552.1; 455/574
(58) Field of Search ............................... 455/41.2, 41.3, 455/426.1, 426.2, 552.1, 574, 343.1, 343.2, 343.5

(56) References Cited

U.S. PATENT DOCUMENTS

| | | | |
|---|---|---|---|
| 5,806,006 A | | 9/1998 | Dinkins |
| 5,870,680 A | | 2/1999 | Guerlin et al. |
| 6,122,524 A | * | 9/2000 | Goerke ..................... 455/552.1 |

FOREIGN PATENT DOCUMENTS

| | | |
|---|---|---|
| EP | 1 126 377 | 8/2001 |
| GB | 2 259 431 A | 3/1993 |
| GB | 2 259 431 A | 10/1993 |
| GB | 2 347 320 | 8/2000 |
| JP | 6-213998 | 8/1994 |
| JP | 8-153075 | 6/1996 |
| JP | 9-68566 | 3/1997 |
| JP | 9-98475 | 4/1997 |
| JP | 9-130861 | 5/1997 |
| JP | 9-281212 | 10/1997 |
| JP | 10-79971 | 3/1998 |
| JP | 11-18159 | 1/1999 |
| JP | 11-98577 | 4/1999 |
| JP | 11-113066 | 4/1999 |
| JP | 11-196472 | 7/1999 |
| JP | 2000-92700 | 3/2000 |

OTHER PUBLICATIONS

Nikkei Electronics, No. 761, Jan. 17, 2000, pp. 37–44.
Nikkei Electronics, No. 759, Dec. 13, 1999, pp. 140–163.
Combined Examination and British Search Report dated May 27, 2004.

* cited by examiner

*Primary Examiner*—Lee Nguyen
(74) *Attorney, Agent, or Firm*—Whitham, Curtis & Christofferson, P.C.

(57) ABSTRACT

In a mobile communication device having a first wireless section for a portable phone and a second wireless section for short range wireless data communication, the second wireless section is controlled by a control section so that it is intermittently put into an on-state under control of a control section in a standby state so as to reduce power consumption of the second wireless section. Such intermittent on-state is established by intermittently turning a battery of the second wireless section in the on-state by the control section. The second wireless section may be controlled individually from or dependently on the first wireless section.

15 Claims, 7 Drawing Sheets

FIG. 10

MOBILE COMMUNICATION DEVICE CAPABLE OF CARRYING OUT BOTH INDIRECT AND DIRECT COMMUNICATION

BACKGROUND OF THE INVENTION

This invention relates to a mobile communication device and a mobile communication system that includes the mobile communication device.

Recent attention has been focused on a Bluetooth technique which enables short range wireless data communication. Such a technique has been described, for example, in articles of Nikkei Electronics, published on Dec. 13, 1999 (pages 139 to 163) and Jan. 17, 2000 (pages 37 to 44). According to these articles, consideration has been made about applying the Bluetooth technique to a mobile telephone. Specifically, such a Bluetooth technique may make it possible to wirelessly couple a mobile telephone to a computer of a note book type. Thus, the Bluetooth technique can carry out wireless direct data communication of a short range that may be called short range wireless data communication hereinafter.

On the other hand, a wide variety of portable telephones have been proposed and widely used. For example, data communication has been carried out by the use of the mobile telephone through an internet, which enables download of various contents through the internet to the portable telephone. Such contents may be music, image, and any other information. Under the circumstances, the portable telephone serves as a multi-purpose tool.

For example, a portable telephone which can carry out data transmission has been described, for example, in Japanese Unexamined Patent Publication Nos. Hei 6-213998 (213998/1994), Hei 8-153075 (153075/1996), Hei 9-68566 (68566/1997), Hei 9-98475 (98475/1997), Hei 9-130861 (130861/1997), Hei 9-281212 (281212/1997), Hei 10-79971 (79971/1998), Hei 11-18159 (18159/1999), and Hei 11-113066 (113066/1999). The publications, have been directed to a portable telephone that may include a GPS (global positioning system) device and/or an IC card. In any event, each portable telephone carries out communication with an opponent or opponent device through at least one base station and therefore carries out indirect communication.

With reference to all the publications, no consideration has been made in the above-enumerated publications about using the portable telephone in common to data communication due to the Bluetooth.

There has been no disclosure made about any problems that might be caused to occur when a portable telephone has a data transmission function due to the Bluetooth in addition to a portable phone function.

For example, when a portable telephone can carry out direct communication in addition to indirect communication, power consumption might be seriously increased in the portable telephone. However, such a problem has not been previously recognized.

For example, when a portable telephone can carry out direct communication in addition to indirect communication, power consumption might be seriously increased in such a portable telephone. However, no teaching has not been pointed out in the prior art about such problems.

SUMMARY OF THE INVENTION

It is an object of this invention to provide a mobile communication device which can carry out both radio communication like a portable telephone and short range wireless data communication by reducing power consumption.

It is another object of this invention to provide a mobile communication device of the type described, which can be small in size, light in weight, and low in cost.

It is still another object of this invention to provide a mobile communication device of the type described, which can reduce power consumption.

It is yet another object of this invention to provide a mobile communication system which includes a mobile communication device of the type described.

According to an aspect of this invention, a mobile communication device comprises a first wireless section which carries out indirect radio communication and which is operable as a portable telephone, a second wireless section which carries out direct data communication, and a control section for carrying out communication control operation of both the first and the second wireless sections. The control section comprises producing means for producing a power control signal indicative of intermittently operating the second wireless section. The second wireless section comprises a power source which is intermittently put into an on-state in response to the power control signal.

In this event, the first wireless section may have a power source controllable by the control section and both power sources of the first and the second wireless sections may be controlled individually and independently of each other by the control section.

Alternatively, both power sources of the first and the second wireless sections are controlled by the control section on the basis of a predetermined condition such that the power source of the second wireless section is intermittently and continuously turned on, while the first wireless section is in a waiting state and in a busy state, respectively. On the other hand, the predetermined condition may be that the power source of the second wireless section is intermittently turned on only during the waiting state in synchronism with the change between the waiting and the busy state, Furthermore, control operation may be performed so that the off-state becomes long when no reception state lasts for a predetermined duration.

The first and the second wireless sections may have individual power sources. In this case, the mobile communication device has a manipulation board which has first and second power switches for individually putting each power source of the first and the second wireless sections into the on-state and the off-state.

According to another aspect of this invention, a mobile communication system comprises a mobile communication device and an external device which carries out direct short range wireless data communication with the mobile communication device. The mobile communication device comprises a first wireless section which carries out indirect radio communication and which is operable as a portable telephone, a second wireless section which carries out direct data communication, and a control section for carrying out communication control operation of both the first and the second wireless sections. In this event, the control section comprises producing means for producing a power control signal indicative of intermittently operating the second wireless section. The second wireless section comprises a power source which is intermittently put into an on-state in response to the power control signal.

According to yet another aspect of this invention, a mobile communication system comprises a mobile communication device and an external device which carries out direct short range wireless data communication with the mobile communication device. The mobile communication device comprises a first wireless section which carries out indirect radio communication and which is operable as a portable telephone, a second wireless section which carries out direct data communication, and a control section for carrying out communication control operation of both the first and the second wireless sections. The control section comprises the second wireless section carrying out data transmission to the external device and transmitting a data transmission request to receive data sent from the external device in response to the data transmission request.

According to another aspect of this invention, a mobile communication device has a portable telephone main block and a terminal portion which is mechanically separated from the portable telephone main block and which carries out short range wireless data communication with the portable telephone main block. In this event, the portable telephone main block has a first antenna for radio communication and a second antenna for the short range wireless data communication with the terminal portion.

Furthermore, the portable telephone main block comprises a first wireless section coupled to the first antenna, a second wireless section coupled to the second antenna, and a first control section coupled to the first and the second wireless sections.

On the other hand, the terminal portion has a keyboard, a display monitor, a second control section coupled to the keyboard and the display monitor, and a third wireless section for carrying out short range wireless data communication with the portable telephone main block.

DESCRIPTION OF THE PREFERRED EMBODIMENTS

Figure 1:
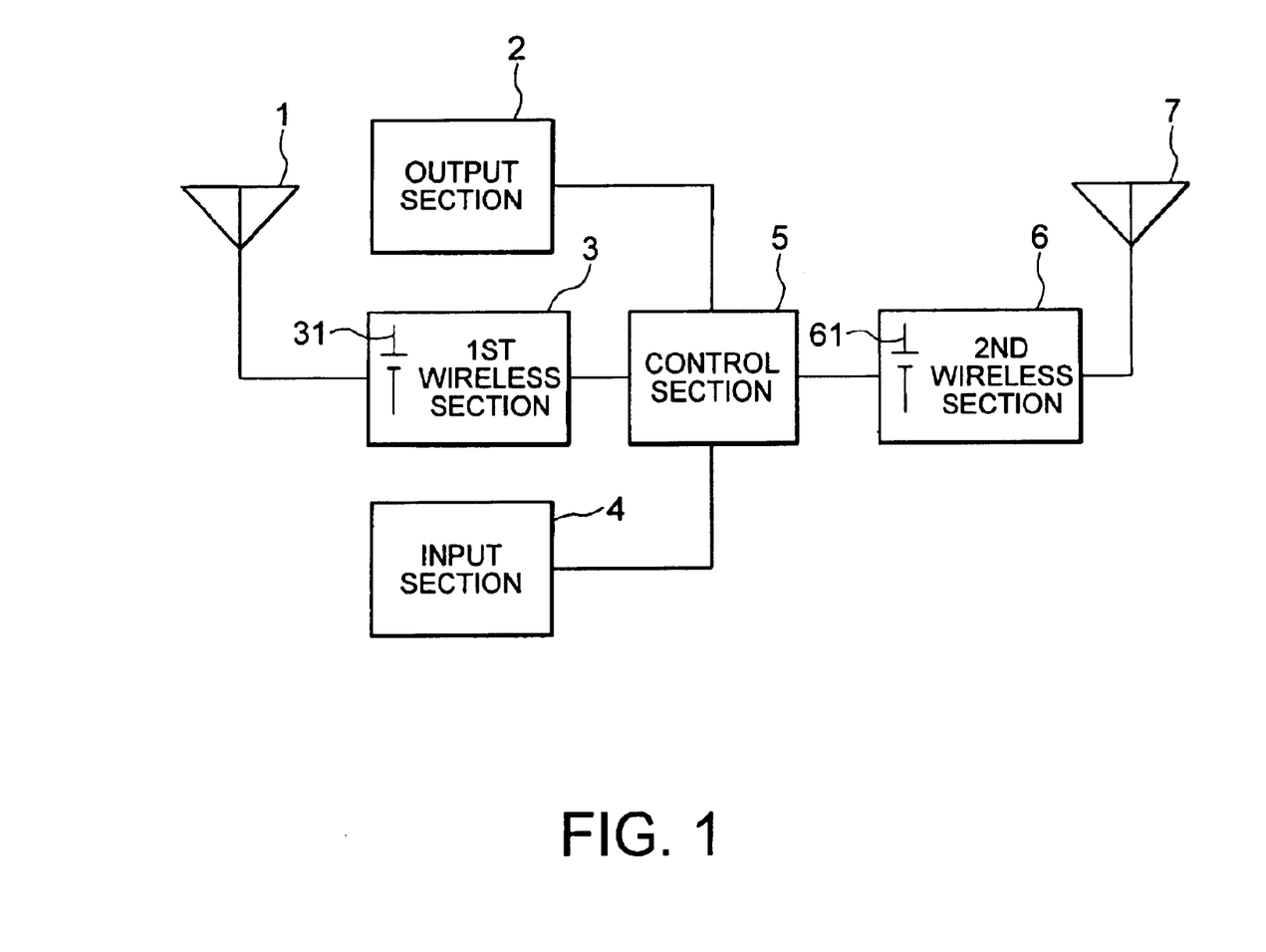
FIG. 1 is a block diagram of a mobile communication device according to an embodiment of this invention.

Referring to FIG. 1, a mobile communication device according to a first embodiment of this invention has a first or mobile antenna 1 and a first wireless section 3 which is operable as a portable telephone (cell phone) and which carries out radio communication. In addition, a second wireless section 6 which is connected to a "Bluetooth" antenna 7 is included in the illustrated device and carries out short range wireless data communication. Herein, it is noted in the instant specification that the radio communication of the first wireless section 3 and the short range wireless data communication of the second wireless section 6 should be distinguished from each other. This is because the radio communication is carried out between subscribers through a base station or the like while the short range wireless data communication is directly carried out between the mobile communication device and an opponent device. Therefore, the former and the latter may be called indirect and direct communication, respectively.

In FIG. 1, a control section 5 is placed between the first and the second wireless sections 3 and 6 to control operations for both the radio communication and the short range wireless data communication, respectively. The control section 5 practically executes various control operations for communication but may be considered as a power control circuit for controlling electric power of the whole of the mobile communication device.

As shown in FIG. 1, the control section 5 is connected to an input or operation section 4, such as a key board, having a plurality of keys for indicating a control operation and an output or display section 2 for displaying data given from outside or inside of the illustrated device.

Specifically, the illustrated control section 5 serves to intermittently and individually operate the second wireless section 6 and the first wireless section 3 and, as a result, to save electric power in the mobile communication device. To this end, the control section 5 performs intermittent power supply control to the second wireless section 6 by supplying the second wireless section 6 with a control signal for the intermittent power control. Therefore, the illustrated control section 5 executes the battery saving operation specified by intermittent power supply to the second wireless section 6. Herein, it is to be noted that the illustrated control section 5 also controls the first wireless section 3 to perform intermittent power supply control to the first wireless section 3 when the first wireless section 3 is put in a wait or standby state. The intermittent power supply control to the second wireless section 6 may be performed independently of that of the first wireless section 3. The intermittent power supply control to the first wireless section 3 may be carried out in a manner known in the art in connection with the portable telephone.

Figure 2:
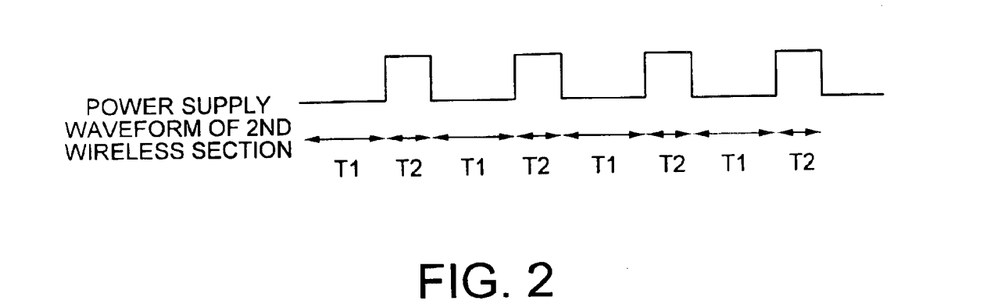
FIG. 2 shows a waveform for use in describing operation of the mobile communication device illustrated in FIG. 1.

Referring to FIG. 2, a description will be made about the intermittent power supply control of the second wireless section 6, which is specified by a power supply waveform of the second wireless section 6 operated by the control signal sent from the control section 5. As shown in FIG. 2, the power supply waveform alternately has an off-period T1 and an on-period T2 which may be, for example, equal to 1 ms and 10 ms, respectively. In any event, the off-period T1 is very much longer than the on-period T2 so as to save power consumption and may be longer than ten times of the on-period T2 in this example. To this end, the control section 5 supplies the second wireless section 6 with the control signal which has the same waveform as illustrated in FIG. 2, during no reception of any wireless or radio wave. From this fact, it is readily understood that the on-period T2 is selected such that the control section 5 can judge whether or not the radio wave is received while the off-period T1 lasts for a duration such that power consumption is effectively reduced and any communication fail to end.

When the control section 5 judges that a reception radio or wireless wave is received by the second wireless portion 6 during the on-period T2, the control section 5 stops the intermittent power supply control and puts the power source of the second wireless section into a continuous on-state. In consequence, the second wireless portion 6 is put into a state of receiving data from an opponent device. After completion of the data reception, the second wireless section 6 is controlled to be put into the state of the intermittent power supply again.

Herein, consideration should be made about data transmission of the second wireless section 6 because the second wireless section 6 carries out the short range wireless data communication. In this event, the intermittent power supply control is stopped by the control section 5 to put the second wireless section 6 into the continuous on-state. Thereafter, the second wireless section is returned back to the state of the intermittent power supply again after completion of the data transmission.

The control section 5 may be controlled so that the off-period T1 illustrated in FIG. 2 becomes long when no reception state of the second wireless section 6 continuously lasts for a time longer than a predetermined duration of, for example, 60 seconds. In the illustrated example, the off-period T1 is extended to four times a usual off-period T1 and is returned to the usual off-period T1 on reception of the wireless wave.

Figure 3:
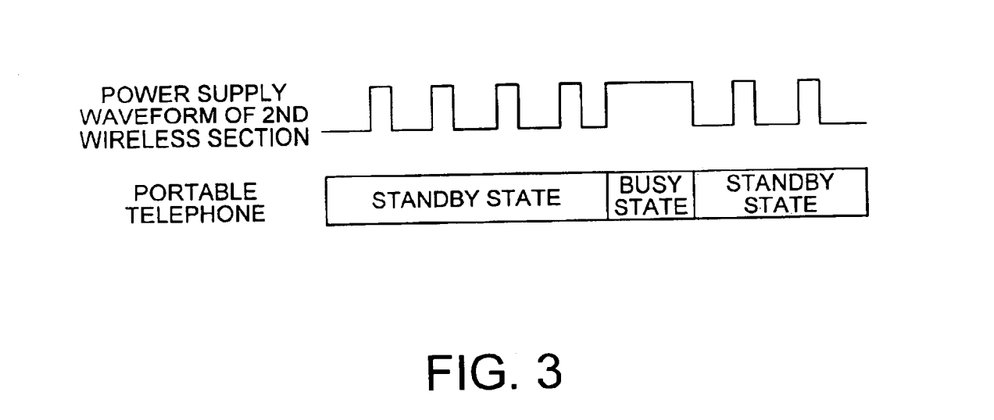
FIG. 3 shows a time chart for use in describing a relationship operation between a first wireless section and a second wireless section illustrated in FIG. 1.

Referring to FIG. 3, another power supply control operation is executed by the control section 5. In FIG. 3, the power supply waveform of the second wireless section 6 is controlled by the control section 5 in relation to states of the first wireless section 3 which carries out the radio communication of the portable telephone. As shown in FIG. 3, the second wireless section 6 is turned on and off in synchronism with the states of the first wireless section 3, namely, the portable telephone. Specifically, when the first wireless section 3 is put in a standby state, the power source or battery of the second wireless section 6 is intermittently and repeatedly put in the on-state and the off-state, as illustrated in FIG. 3. On the other hand, the battery of the second wireless section 6 is put into the continuous on-state during a busy state of the portable telephone.

Thus, the illustrated mobile communication device is equipped with the first and the second wireless sections 3 and 6 and can carry out not only the radio communication of the portable telephone but also the short range wireless communication. Such radio communication and short range wireless communication can be accomplished at reduced power by executing battery saving operation of the second wireless section 6 in addition to the first wireless section 3.

Figure 4:
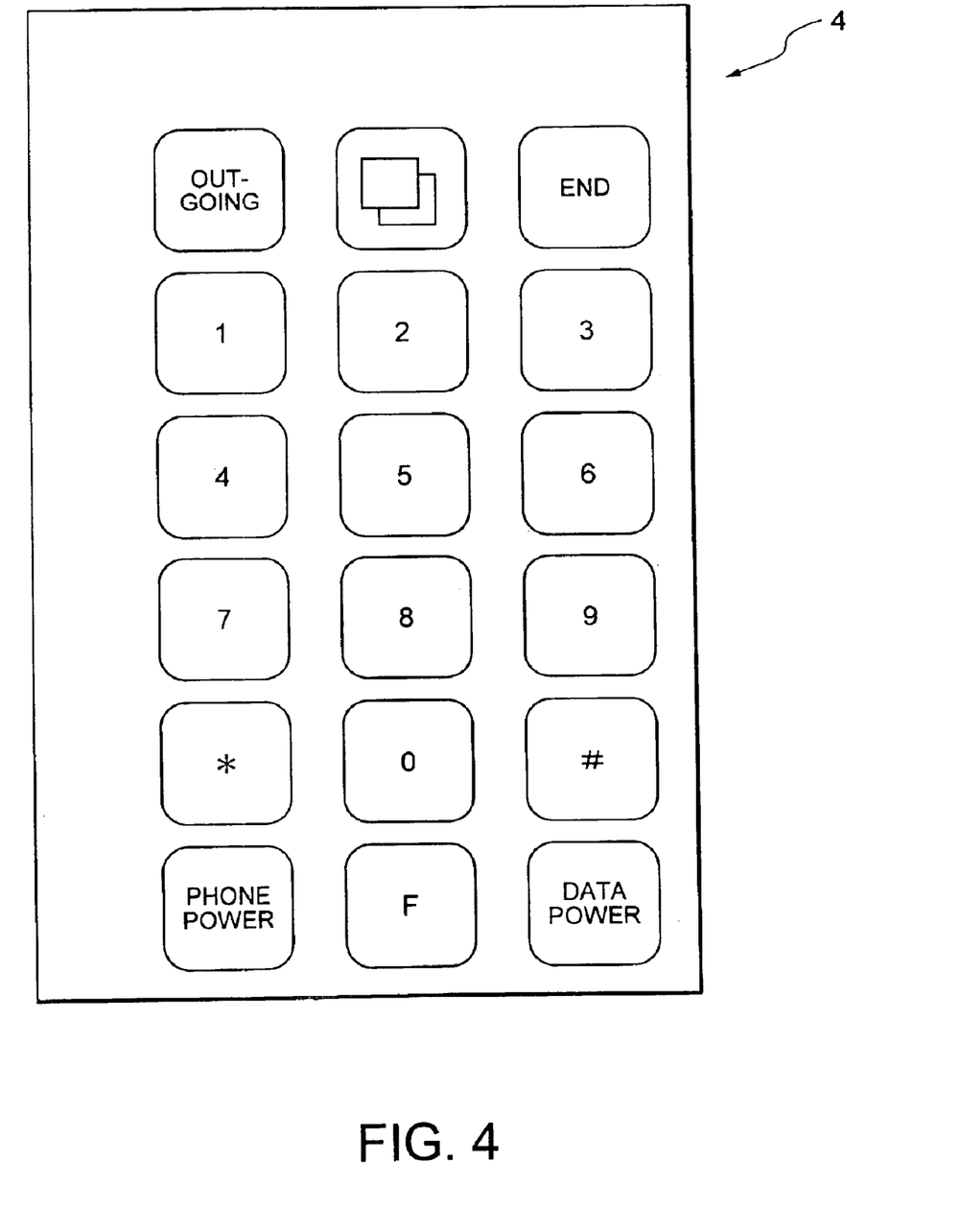
FIG. 4 shows a plan view of a key board of an input section illustrated in FIG. 1.

Referring to FIG. 4, the input or operation section 4 illustrated in FIG. 1 has a calling or outgoing key, an end key, a redial key, numeric keypads, and a function key (depicted by F). Moreover, the operation section 4 further has a phone power switch and a data power switch both of which turn the first and the second wireless sections 3 and 6 on, respectively. In other words, the radio communication and the short range wireless communication can be powered by the phone power switch and the data power switch in the illustrated mobile, respectively. In this event, the phone and the data power switches may be selectively or concurrently turned on by a bearer or a possessor.

In the illustrated example, it is assumed that the phone power switch and the data power switch serve to put the first wireless section 3 and the second wireless section 6 into the on-states, respectively. In other words, the first and the second wireless sections 3 and 6 have individual batteries which may be called first and second batteries (as symbolized by 31 and 61 in FIG. 1, respectively). The first and the second batteries 31 and 61 may be independently turned on and off under control of the control section 5 when the phone and the data power switches are pushed down.

Figure 5:
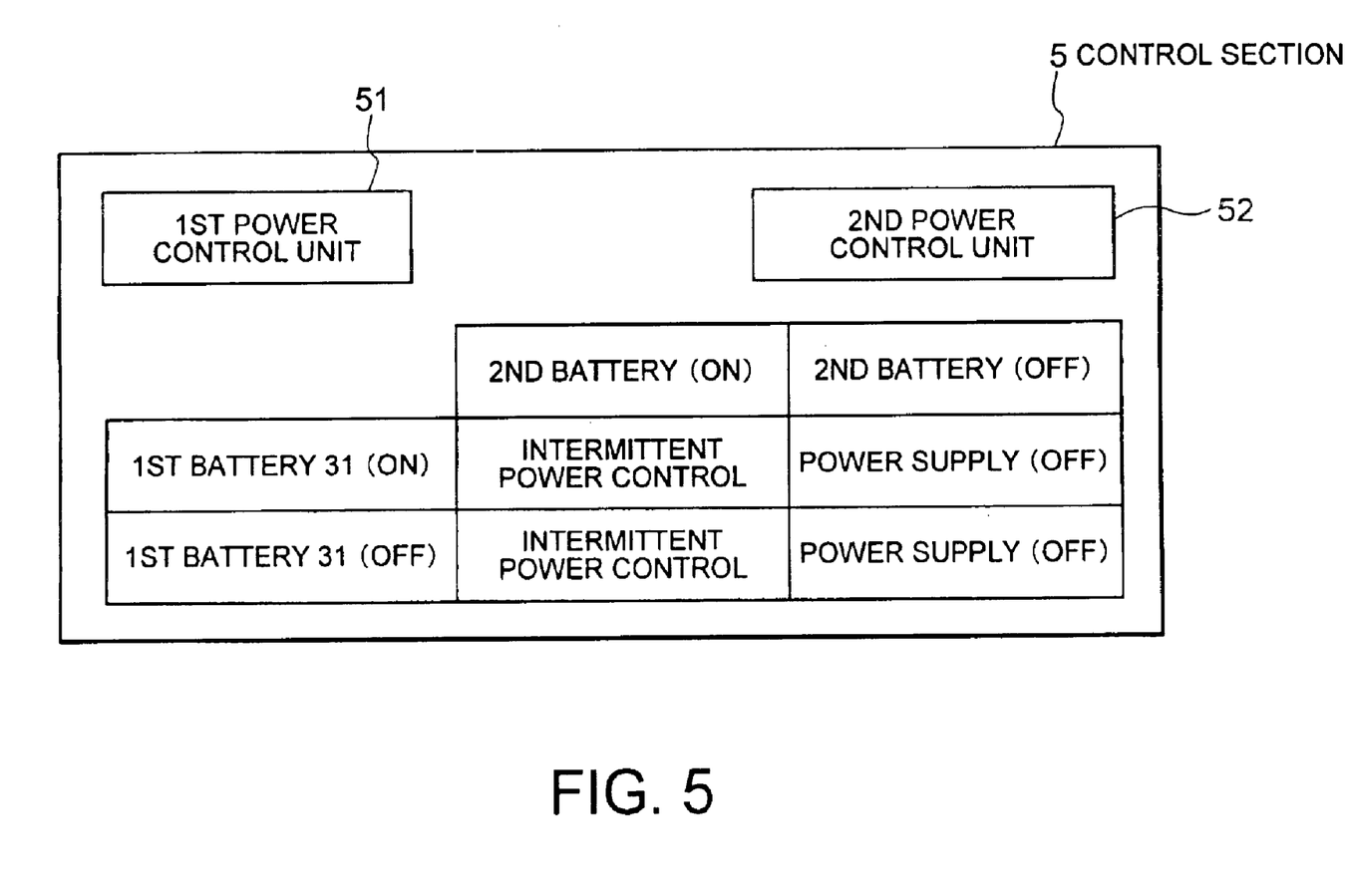
FIG. 5 shows a block diagram of a control section illustrated in FIG. 1.

Referring to FIG. 5, the control section 5 illustrated in FIG. 1 is featured by a first power control unit 51, a second power control unit 52, and a control table 53. Herein, the first and the second power control units 51 and 52 are used for controlling the power supply of the first and the second wireless sections 3 and 6, respectively, in accordance with the control table 53. As illustrated in the control table 53, the intermittent power control is carried out when both of the first and the second batteries 31 and 51 is kept in the on-state. Likewise, the intermittent power control is carried out when either one of the first and the second batteries 31 and 51 is kept in the on-state with the remaining one held in the off-state. In other words, the intermittent power control is not carried out while both the first and the second batteries 31 and 51 are turned off or each of the first and the second batteries 31 and 51 is kept in the off-state.

From this fact, it is readily understood that the second wireless section 5 is turned on or off independently of the first wireless portion 3.

Figure 6:
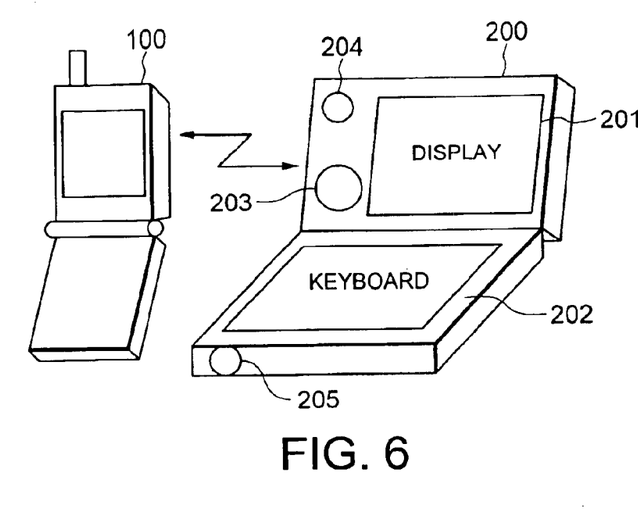
FIG. 6 is a mobile communication system which includes the mobile communication device illustrated in FIG. 1.

Referring to FIG. 6, description will be made about a wireless communication system that includes the mobile communication device (depicted by 100 in FIG. 6) mentioned in conjunction with FIGS. 1 through 5. The mobile communication device 100 can store or get various information of an image, a voice, a music, a telephone directory, a character, and the like by manipulating the input section 4 (FIG. 1). Such information can directly be transmitted from the second wireless section 6 through the Bluetooth antenna 7 to a computer 200, such as a personal computer, without passing through any base station. Furthermore, the mobile communication device 100 can issue a request to the computer 200 on demand through the second wireless section 6. When the request is a data transmission request from the personal computer 200, the computer 200 transmits, to the mobile communication device 100, data stored in the computer 200 and requested by the mobile communication device 100. The transmitted data is received by the second wireless section 6 and is processed in the mobile communication device 100.

Thus, communication, such as transmission, reception, can be carried out between the illustrated mobile communication device 100 and the computer 200. This means that the mobile communication device 100 can utilize the computer 200 as an external or outside memory device. In the illustrated example, data transmission may be executed at each unit of 64 bits including an address of 32 bits. In general, transmission may be done at each data unit of N bits including an address of M bits, where N is an integer and M is an integer smaller than N.

Referring back to FIG. 6, the illustrated computer 200 has a display monitor 201 for displaying data received from the mobile communication device 100. The illustrated display monitor 201 is formed by a liquid crystal display (LCD).

In this example, let a sequence of data be received at every data unit of 64 bits by the computer 200. In this event, an initial one of the data units includes an address of 32 bits indicative of a start of the data sequence and a predetermined address of 32 bits assigned to a specific. data unit. The remaining data unit sequence is successively transmitted as data units to be displayed on the display monitor 201.

Thereafter, an end data unit follows the transmitted data units and is composed of an end code of 32 bits indicative of an end of transmission and an address of 32 bits assigned to the end code.

In addition, the mobile communication device 100 can directly transmit, to the computer 200, sound information representative of a voice and a melody through a communication portion of the second wireless section 6 illustrated in FIG. 1. The sound information is transmitted in the form of a sequence of sound data units. Responsive to the sound data unit sequence, the computer 200 can reproduce sounds through a loudspeaker 203. In this case, the sound data units of 64 bits are each successively reproduced as sounds through the loudspeaker 205. The sound data unit sequence has a sound start data unit composed of a sound start code of 32 bits indicative of a start of the sound information and an address code of 32 bits assigned to the sound start code. The sound start data unit is followed by sound data units and a sound end data unit composed of a sound end code of 32 bits indicative of an end of the sound information and an address assigned to the sound end data unit.

In the illustrated example, it is assumed that the computer 200 can transmit various kinds of information, such as directory number, operation information, given to the computer 200 by manipulating keys arranged on a key board 202. Such information is sent to the mobile communication device 100 in the form of a sequence of data units. The mobile communication device 100 illustrated in FIG. 6 can successively receive the data units as an input data sequence through the communication portion and executes operations on the basis of the input data sequence. Each of the input data units is also composed of 64 bits. An initial one of the input data units is composed of input data of 32 bits and an address of 32 bits assigned to the input data and is transmitted from the computer 200 to the mobile communication device 100.

Moreover, it is assumed that the illustrated computer 200 can directly transmit voice input information that is input from a microphone 205 and that the mobile communication device 100 can receive and reproduce the voice input information given through the microphone 205 of the computer 200. Such voice input information is also transmitted from the computer 200 at every voice unit of 64 bits. In this event, the voice unit sequence includes a start unit which includes a voice start code of 32 bits and an address of 32 bits assigned to the voice start code. Thereafter, the voice input information is directly sent from the computer 200 to the mobile communication device 100 in a manner similar to the above.

In addition, the computer 200 shown in FIG. 6 can also directly transmit image information taken by a camera 204 attached to the computer 200. Such image information is also wirelessly sent from the computer 200 to the mobile communication device 100 in the form of a sequence of data units or sets of 64 bits from a leading one of the data units to a last one. The leading data unit has an image start code of 32 bits and an address of 32 bits assigned to the image information while the last data unit has an image end code of 32 bits and an address of 32 bits assigned to the image information.

The image information is received by the second wireless portion 6 of the mobile communication device 100. Specifically, the communication portion of the second wireless portion 6 is enabled in response to the image information to be stored or processed by the mobile communication device 100. Such image information may be transferred to any other communication device or devices.

In any event, the mobile communication device 100 mentioned with reference to FIGS. 1 through 6 can reduce consumption of power or electric current by having the second wireless section 6. This is because control operation is carried out such that the second wireless section 6 is intermittently powered on in a waiting or standby state and, as a result, intermittent power supply to the second wireless section 6 is performed. Power or electric current consumption can be more effectively reduced by lengthening the off-period of the second wireless section 6 during no reception of any wireless or radio wave and/or by individually locating the phone power key and the data power key, as illustrated in FIG. 4, connected to the individual circuits powered by the respective keys. In the system illustrated in FIG. 6, functions of the mobile communication device 100 are partially assigned to the computer 200. Specifically, the mobile communication device 100 can use the computer 200 as an external memory, an external display device, an audio device, an input device of the mobile communication device 100.

Figure 7:
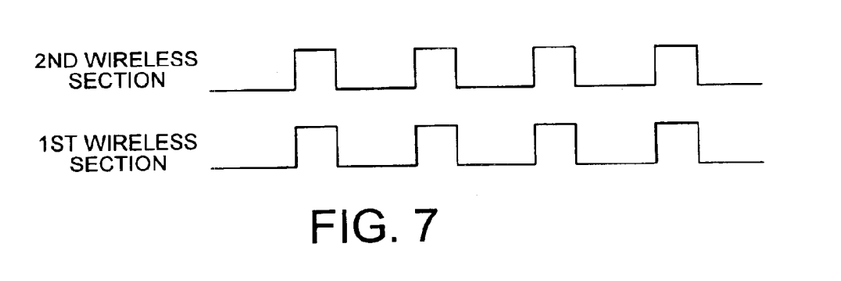
FIG. 7 shows a waveform for use in describing another operation of the first and the second wireless sections illustrated in FIG. 1.

Referring to FIG. 7, exemplification is made about another control operation of performing intermittent power supply to the first wireless section 3 and the second wireless section 6 (FIG. 1). Specifically, the second wireless section 6 which is operable as a Bluetooth device is controlled depending on the operation of the first wireless section 3 which is operable as a portable telephone. In the illustrated example, the second power source or battery of the second wireless section 6 is controlled in synchronism with the first power source or battery of the first wireless section 3. In this connection, when the first wireless section 3 is in the standby state, the second battery of the second wireless section 6 is put into turned on in synchronism with the turn-on operation of the first battery of the first wireless section 3. Such dependent power control of the second wireless section 6 makes it possible to reduce power consumption in comparison with the independent power control mentioned in conjunction with FIGS. 1 through 6.

Alternatively, the second wireless section 6 (illustrated in FIG. 1) may be power controlled in a manner different from the above. For example, the battery of the second wireless section 6 may be usually put into the off-state under control of the control section 5 and may be turned on only when data transmission/reception of data is needed by using the second wireless section 6. In this event, when transmission/reception of data is finished by the use of the second wireless section 6, the battery of the second wireless section 6 is in the off-state by the control section 5. Furthermore, the battery of the second wireless section 6 is intermittently turned on by the control section 5 in the standby state that takes place during receiving the necessary data. This method is effective so as to reduce power consumption as compared with the method that always carries out intermittent power supply to the second wireless section 6.

Figure 8:
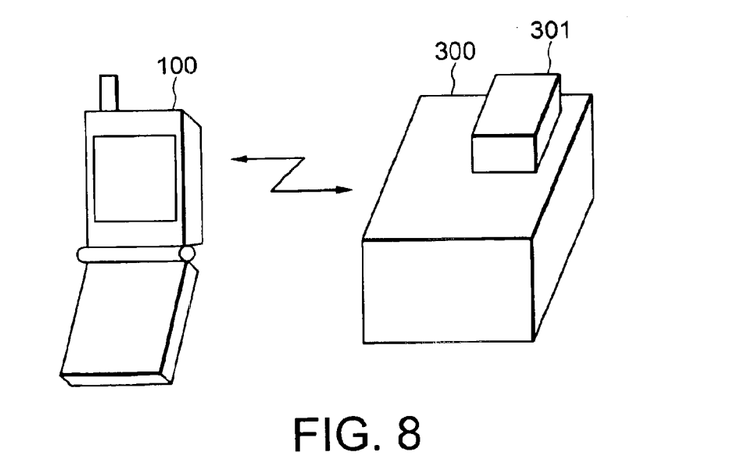
FIG. 8 is another mobile communication system that includes the mobile communication device illustrated in FIG. 1.

Referring to FIG. 8, another wireless communication system is illustrated which uses the mobile communication device 100 shown with reference to FIGS. 1 through 6. In the illustrated example, the mobile communication device 100 is wirelessly coupled to a device which is operable in a global positioning system (GPS) and which may be called a GPS device. The GPS device 300 is assumed to have a GPS main body 300 and a GPS antenna 301 and can carry out short range data communication with the mobile communication device 100.

Under the circumstances, the illustrated mobile communication device 100 carries out the data communication with the GPS device by using the second wireless section 6. With this structure, it is possible for the mobile communication device 11 to receive positioning information or time information from the GPS device by directly transmitting an information request to the GPS device. Responsive to the positioning information, the time information, and the like, the mobile communication device 100 displays such information on its display monitor and/or transmits it to a portable telephone network. The mobile communication device 100 may adjust a time in response to the received time information. In addition, map information, image information, or the like may be transmitted from the GPS device to the mobile communication device 100. With this structure, the mobile communication device 100 itself can get necessary information without any GPS device and can be small in size, light in weight, and low in cost.

Figure 9:
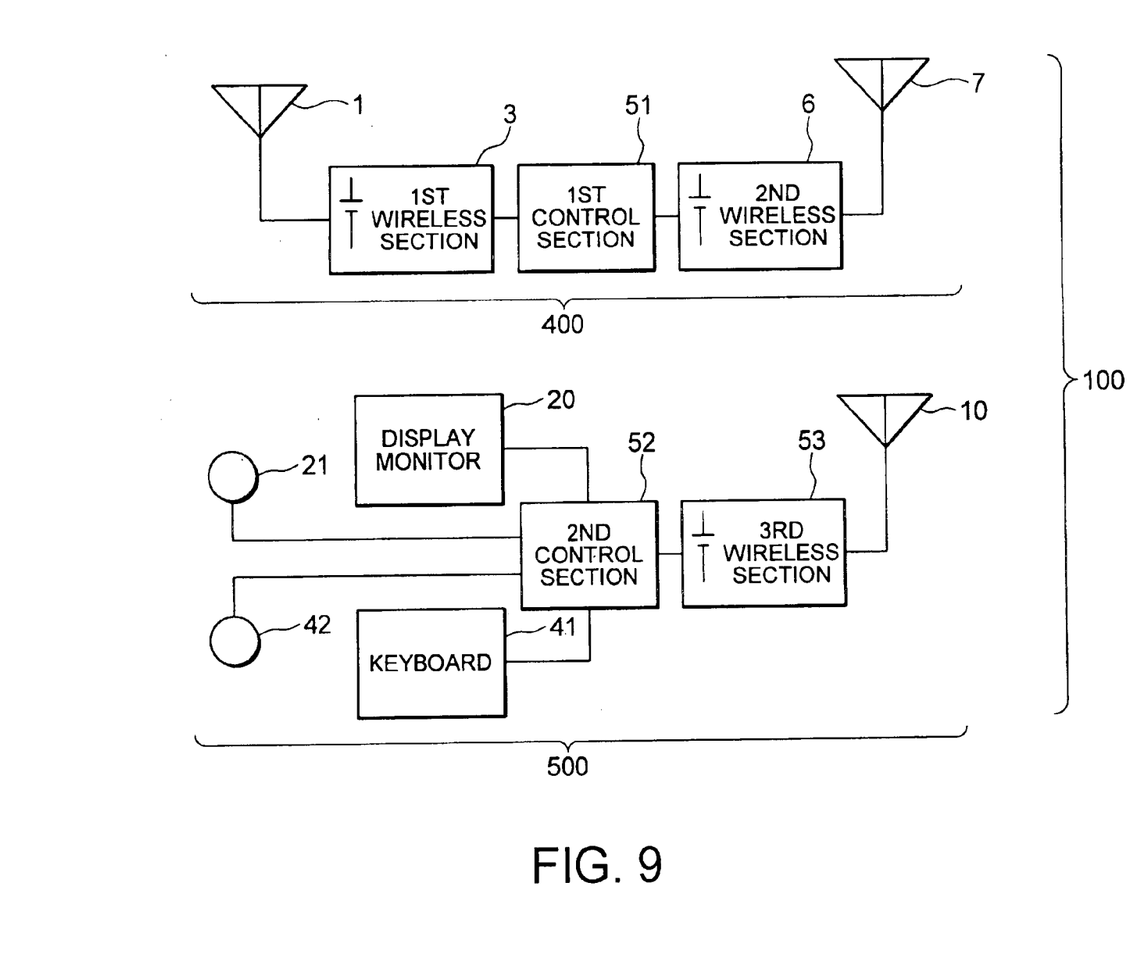
FIG. 9 shows another mobile communication device according to another embodiment of this invention.
Figure 10:
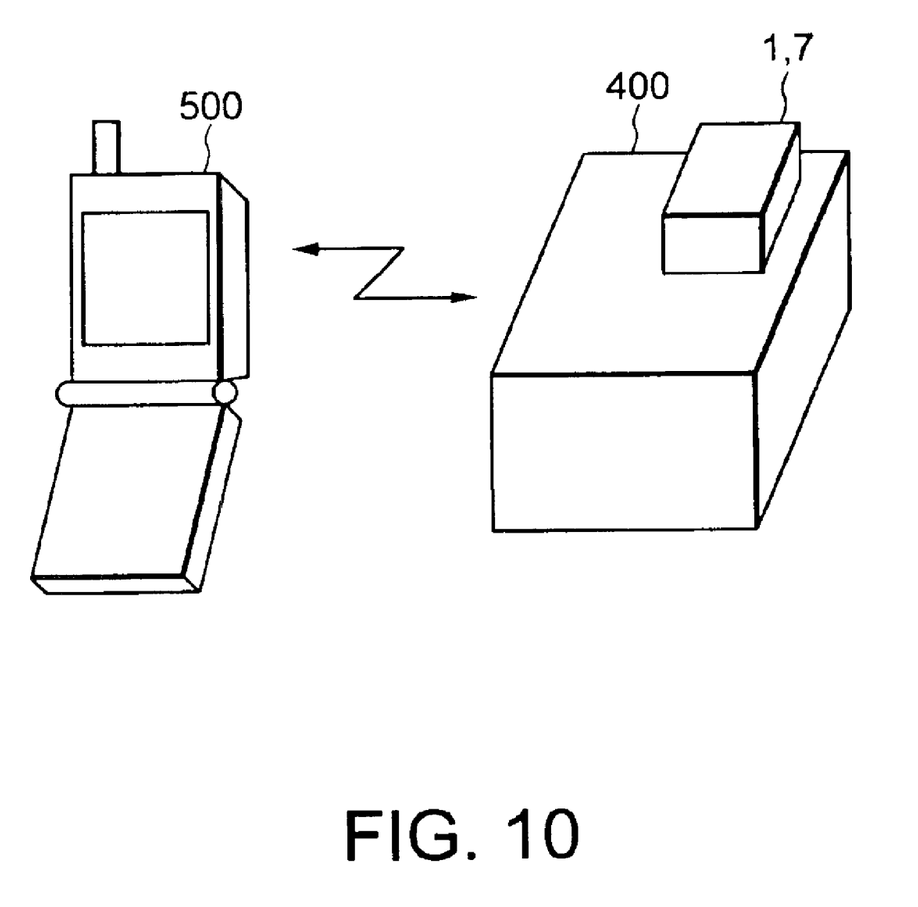
FIG. 10 shows a mobile communication system which includes the mobile communication device illustrated in FIG. 9.

Referring to FIGS. 9 and 10, a mobile communication device 100 according to another embodiment of this invention is described together with a communication system which uses the mobile communication device. In FIG. 9, the mobile communication device 100 has a portable phone main block 400 and a phone terminal portion 500 both of which are mechanically separated from each other and which carry out short range wireless communication between them.

In this case, the phone terminal portion 500 is somewhat distant from the portable phone main block 400, as shown in FIG. 10. The illustrated portable phone main block 400 has two antennas composed of a mobile antenna 1 and a Bluetooth antenna 7.

More specifically, the portable phone main block 400 has the first or mobile antenna 1, the Bluetooth antenna 7, and first and second wireless sections 3 and 6, all of which are similar in structure and operation to those illustrated in FIG. 1. In addition, the first and the second wireless sections 3 and 6 are controlled by a first controller 51 which is similar in operation to the control section 5 illustrated in FIG. 1 so as to intermittently put the first and the second wireless sections 3 and 6 into on-state individually or dependently in the manner mentioned above.

On the other hand, the phone terminal portion 500 has a display monitor 20, a receiver 21, a key board 41, and a microphone 42. In the illustrated example, a combination of the display monitor 20 and the receiver 21 serves as the output section 2 illustrated in FIG. 1 while the a combination of the key board 41 and the microphone 42 serves as the input section 4 illustrated in FIG. 1. Furthermore, a second control section 52 is coupled to the display monitor 20, the receiver 21, the key board 41, and the microphone 42 like in FIG. 2 and is connected to a third control section 53 coupled to a Bluetooth antenna 10.

With this structure, radio communication is carried out through the first antenna 1. In this event, the illustrated portable communication device 100 is operable as a portable telephone. On the other hand, short range wireless data communication is carried out through the Bluetooth antennas 7 and 10. In this case, the illustrated device is operable as a Bluetooth device.

Let a radio wave be received from the antenna 1 through the first wireless section 3 and be given to the first control section 51 as a received data sequence. The first control section 51 transmits the received data sequence through the Bluetooth antenna 7 to the phone terminal portion 500 by carrying out the short range wireless data communication, The data sequence received through the Bluetooth antenna 10 in the phone terminal portion 500 is sent through the third control section 53 to the second control section 52. The second control section 52 processes the received data sequence into a voice data signal or an image data signal in accordance with the received data sequence. The voice data signal is sent to the receiver 21 to generate a sound while the image data signal is sent to the display monitor 20 to be visually displayed on the display monitor 20.

On the other hand, key information generated by manipulating the key board 41 is converted into a key input data sequence by the second control section 52 and is sent through the third control section 53 and the Bluetooth antenna 10 to the Bluetooth antenna 7 of the portable phone main block 400. Likewise, a voice input signal supplied from the microphone 42 is converted into a voice data sequence by the second control section 52 and sent to the portable phone main block 400 by carrying out the short range wireless data communication.

Responsive to the key input data sequence and the voice data sequence, the portable phone main block 400 processes each of the key input data sequence and the voice data sequence by the first control section 51 to transmit them through the antenna 1 in the form of a radio wave. The radio wave may be transmitted to the computer 200 as shown in FIG. 6. Thus, the illustrated system also can use the computer 200 as a terminal device.

The mobile communication device 100 illustrated in FIG. 9 is separated into the main block 400 and the terminal portion 500 both of which are coupled to each other by carrying out the short range wireless data communication. With this structure, the mobile communication device 100 is small in size and light in weight.

At any rate, each of the first, the second, and the third wireless sections 3, 6, and 53 may have individual batteries and may be intermittently put into on-states under control of the first and the second control sections 51 and 52 in a manner similar to that mentioned above.

While this invention has thus far been described in conjunction with a few embodiments thereof, it will be readily possible for those skilled in the art to put this invention into practice in various other manners. For example, the portable communication device may be either a PDA device or a personal computer of a note type, if both radio communication and Bluetooth communication can be executed in each device.

What is claimed is:

1. A mobile communication device comprising a first wireless section which carries out indirect radio communication and which is operable as a portable telephone, a second wireless section which carries out direct data communication, and a control section for carrying out communication control operation of both the first and the second wireless sections, wherein the first wireless section is intermittently and continuously power-controlled by the control section, while the first wireless section is in a waiting state and in a busy state, respectively; and the second wireless section is intermittently power-controlled by the control section during the waiting state in synchronism with a change between the waiting state and the busy state of the first and second wireless section.

2. A mobile communication device as claimed in claim 1, wherein the first and second wireless sections have individual power sources controllable by the control section;

the power source of the first wireless section is intermittently and continuously turned on, while the first wireless section is in a waiting state and in a busy state, respectively; and the power source of the second wireless section is intermittently turned on only during the waiting state in synchronism with a change between the waiting state and the busy state.

3. A mobile communication device as claimed in claim 2, further comprising a manipulation board which has first and second power switches for individually putting each power source of the first and the second wireless sections into the on-state and the off-state.

4. A mobile communication device as claimed in claim 3, wherein the power source of the second wireless section is put into the on-state when the second power switch is turned on, even if the first power switch of the first wireless section is put into the off-state.

5. A mobile communication device as claimed in claim 2, wherein the indirect radio communication is carried out using Bluetooth technology.

6. A mobile communication system comprising a mobile communication device and an external device which carries out direct short range wireless data communication with the mobile communication device, the mobile communication device comprising a first wireless section which carries out indirect radio communication and which is operable as a portable telephone, a second wireless section which carries out direct data communication, and a control section for carrying out communication control operation of both the first and the second wireless sections, wherein the first wireless section is intermittently and continuously power-controlled by the control section, while the first wireless section is in a waiting state and in a busy state, respectively; and the second wireless section is intermittently power-controlled by the control section during the waiting state in synchronism with a change between the waiting state and the busy state of the first and second wireless section.

7. A mobile communication system as claimed in claim 6, wherein the first and second wireless sections have individual power sources controllable by the control section;

the power source of the first wireless section is intermittently and continuously turned on, while the first wireless section is in a waiting state and in a busy state, respectively;

the power source of the second wireless section is intermittently turned on only during the waiting state in synchronism with a change between the waiting state and the busy state; and the second wireless section carrying out data transmission to the external device and transmitting a data transmission request to receive data sent from the external device in response to the data transmission request.

8. A mobile communication system as claimed in claim 7, wherein the data received/transmitted includes any of image, voice, melody, directory number, and character.

9. A mobile communication system as claimed in claim 7, wherein the external device has a display monitor for displaying the data sent from the second wireless section of the mobile communication device.

10. A mobile communication system as claimed in claim 7, wherein the external device has an audio unit for reproducing the data sent from the second wireless section of the mobile communication device.

11. A mobile communication system as claimed in claim 7, wherein the mobile communication device has a reproducing unit for reproducing the data sent from the external device and received through the second wireless section.

12. A mobile communication system as claimed in claim 11, wherein the reproducing unit has a display unit or a loudspeaker for reproducing the data.

13. A mobile communication system as claimed in claim 7, wherein the external device is a computer.

14. A mobile communication system as claimed in claim 7, wherein the external device is a GPS device.

15. A mobile communication device as claimed in claim 7, wherein the indirect radio communication is carried out using Bluetooth technology.

* * * * *